US012046837B2

(12) United States Patent
Yang et al.

(10) Patent No.: US 12,046,837 B2
(45) Date of Patent: Jul. 23, 2024

(54) COMMUNICATION DEVICE

(71) Applicant: Wistron Corp., New Taipei (TW)

(72) Inventors: Cheng-Chieh Yang, New Taipei (TW); Yi Shien Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 17/582,224

(22) Filed: Jan. 24, 2022

(65) Prior Publication Data

US 2023/0178893 A1 Jun. 8, 2023

(30) Foreign Application Priority Data

Dec. 7, 2021 (TW) ................................ 110145601

(51) Int. Cl.

*H01Q 1/24* (2006.01)
*H01Q 1/27* (2006.01)
*H01Q 1/38* (2006.01)
*H01Q 5/50* (2015.01)
*H01Q 9/32* (2006.01)

(52) U.S. Cl.

CPC ............... *H01Q 5/50* (2015.01); *H01Q 1/241* (2013.01); *H01Q 1/38* (2013.01); *H01Q 9/32* (2013.01)

(58) Field of Classification Search

CPC ............ H01Q 1/24; H01Q 1/241; H01Q 1/27; H01Q 1/273; H01Q 5/30; H01Q 5/321; H01Q 5/335; H01Q 5/371; H01Q 5/50; H01Q 9/32; H01Q 9/40

See application file for complete search history.

(56) References Cited

U.S. PATENT DOCUMENTS 10,069,196 B1 * 9/2018 Yen .................... H01Q 21/0031
11,128,050 B1 * 9/2021 Chuang .................. H01Q 5/371
2004/0080457 A1 4/2004 Guo
2005/0280589 A1 12/2005 Chiang et al.
2009/0197638 A1 * 8/2009 Park ......................... H04B 1/18 455/73

(Continued)

FOREIGN PATENT DOCUMENTS

CN 105991152 A 10/2016
CN 112886213 A 6/2021

(Continued)

OTHER PUBLICATIONS

Chinese language office action dated Oct. 4, 2022, issued in application No. TW 110145601.

(Continued)

*Primary Examiner* — Thai Pham
(74) *Attorney, Agent, or Firm* — McClure, Qualey & Rodack, LLP

(57) ABSTRACT

A communication device includes an RF (Radio Frequency) module, an antenna structure, a first switch element, a second switch element, a plurality of first impedance elements, and a plurality of second impedance elements. The antenna structure is coupled to the RF module. The antenna structure includes a first radiation element and a second radiation element. The first switch element is coupled to the first radiation element. The first switch element is switchable between the first impedance elements. The second switch element is coupled to the second radiation element. The second switch element is switchable between the second impedance elements.

17 Claims, 10 Drawing Sheets

(56) References Cited

U.S. PATENT DOCUMENTS

| | | | | |
|---|---|---|---|---|
| 2010/0103069 | A1 | 4/2010 | Wang et al. | |
| 2010/0156726 | A1 | 6/2010 | Montgomery et al. | |
| 2014/0057578 | A1* | 2/2014 | Chan | H04B 1/18 455/73 |
| 2014/0306855 | A1* | 10/2014 | Tsai | H01Q 9/42 343/745 |
| 2016/0104935 | A1 | 4/2016 | Hung | |
| 2016/0156101 | A1* | 6/2016 | Tsai | H01Q 5/328 343/745 |
| 2017/0264002 | A1* | 9/2017 | Yen | H01Q 9/26 |
| 2018/0026339 | A1 | 1/2018 | Chih et al. | |
| 2018/0090847 | A1 | 3/2018 | Romano et al. | |
| 2020/0106159 | A1* | 4/2020 | Hsu | H01Q 1/48 |
| 2023/0028988 | A1* | 1/2023 | Li | H01Q 5/371 |

FOREIGN PATENT DOCUMENTS

| | | | |
|---|---|---|---|
| CN | 113131195 | A | 7/2021 |
| EP | 3 188 313 | A1 | 7/2017 |
| EP | 3 376 593 | A1 | 9/2018 |
| JP | 2006-504328 | A | 2/2006 |
| JP | 2008-503941 | A | 2/2008 |
| JP | 2012-160817 | A | 8/2012 |
| JP | 2013-160817 | A | 8/2012 |
| JP | 2017-532886 | A | 11/2017 |
| TW | 201017978 | A | 5/2010 |
| TW | 201440319 | A | 10/2014 |
| TW | 201620203 | A | 6/2016 |
| WO | 2016/073327 | A1 | 5/2016 |
| WO | 2020/114849 | A1 | 6/2020 |

OTHER PUBLICATIONS

Chinese language office action dated Dec. 12, 2022, issued in application No. TW 110145601.

Japanese language office action dated Jan. 10, 2023, issued in application No. JP 2022-070758.

English language translation of office action dated Jan. 10, 2023, issued in application No. JP 2022-070758.

European Search Report dated Aug. 8, 2022, issued in application No. EP 22159761.0.

Japanese language office action dated May 9, 2023, issued in application No. JP 2022-070758.

English language translation of office action dated May 9, 2023, issued in application No. JP 2022-070758.

Japanese language office action dated May 21, 2024, issued in application No. JP 2023-037710.

* cited by examiner

COMMUNICATION DEVICE

CROSS REFERENCE TO RELATED APPLICATIONS

This application claims priority of Taiwan Patent Application No. 110145601 filed on Dec. 7, 2021, the entirety of which is incorporated by reference herein.

BACKGROUND OF THE INVENTION

Field of the Invention

The disclosure generally relates to a communication device, and more particularly, it relates to a communication device supporting wideband operations.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, 2500 MHz, and 2700 MHz. Some devices cover a small wireless communication area; these include mobile phones using Wi-Fi and Bluetooth systems and using frequency bands of 2.4 GHz, 5.2 GHz, and 5.8 GHz.

Antennas are indispensable elements for wireless communication. If an antenna used for signal reception and transmission has a narrow operational bandwidth, it will negatively affect the communication quality of the mobile device. Accordingly, there is a need to propose a novel solution for solving the problems of the prior art.

BRIEF SUMMARY OF THE INVENTION

In an exemplary embodiment, the disclosure is directed to a communication device that includes an RF (Radio Frequency) module, an antenna structure, a first switch element, a second switch element, a plurality of first impedance elements, and a plurality of second impedance elements. The antenna structure is coupled to the RF module. The antenna structure includes a first radiation element and a second radiation element. The first switch element is coupled to the first radiation element. The first switch element is switchable between the first impedance elements. The second switch element is coupled to the second radiation element. The second switch element is switchable between the second impedance elements.

In some embodiments, the antenna structure covers a first frequency band, a second frequency band, a third frequency band, and a fourth frequency band.

In some embodiments, the first frequency band is from 700 MHz to 900 MHz. The second frequency band is from 1700 MHz to 2200 MHz. The third frequency band is from 3000 MHz to 4200 MHz. The fourth frequency band is from 4400 MHz to 5000 MHz.

In some embodiments, the vertical projection of the second radiation element at least partially overlaps the first radiation element.

In some embodiments, the antenna structure further includes a feeding connection element. The feeding connection element is coupled between the first radiation element and the second radiation element.

In some embodiments, the antenna structure has a feeding point coupled to the RF module. The feeding point is adjacent to the feeding connection element.

In some embodiments, the first radiation element has a first end and a second end. The first end of the first radiation element is coupled to the feeding connection element. The second end of the first radiation element is coupled to the first switch element.

In some embodiments, the second radiation element has a first end and a second end. The first end of the second radiation element is coupled to the feeding connection element. The second end of the second radiation element is coupled to the second switch element.

In some embodiments, the communication device further includes a PCB (Printed Circuit Board) for providing a ground voltage. The second radiation element is disposed between the first radiation element and the PCB.

In some embodiments, the first radiation element, the second radiation element, and the PCB are substantially parallel to each other.

In some embodiments, the PCB substantially has a circular shape or a rectangular shape.

In some embodiments, the first radiation element substantially has a long arc-shape or a long L-shape and extends along the outer edge of the PCB.

In some embodiments, the second radiation element substantially has a short arc-shape or a short L-shape and extends along the outer edge of the PCB.

In some embodiments, the first impedance elements include an inductive element, a capacitive element, an open-circuited element, and/or a short-circuited element, which are all coupled to the ground voltage.

In some embodiments, the second impedance elements include an inductive element, a capacitive element, an open-circuited element, and/or a short-circuited element, which are all coupled to the ground voltage.

In some embodiments, the length of the first radiation element is substantially equal to 0.5 wavelength of the first frequency band.

In some embodiments, the width of the first radiation element is from 1 mm to 3 mm.

In some embodiments, the length of the second radiation element is substantially equal to 0.5 wavelength of the second frequency band.

In some embodiments, the width of the second radiation element is from 1 mm to 3 mm.

In some embodiments, the thickness of the first radiation element is greater than the thickness of the second radiation element.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
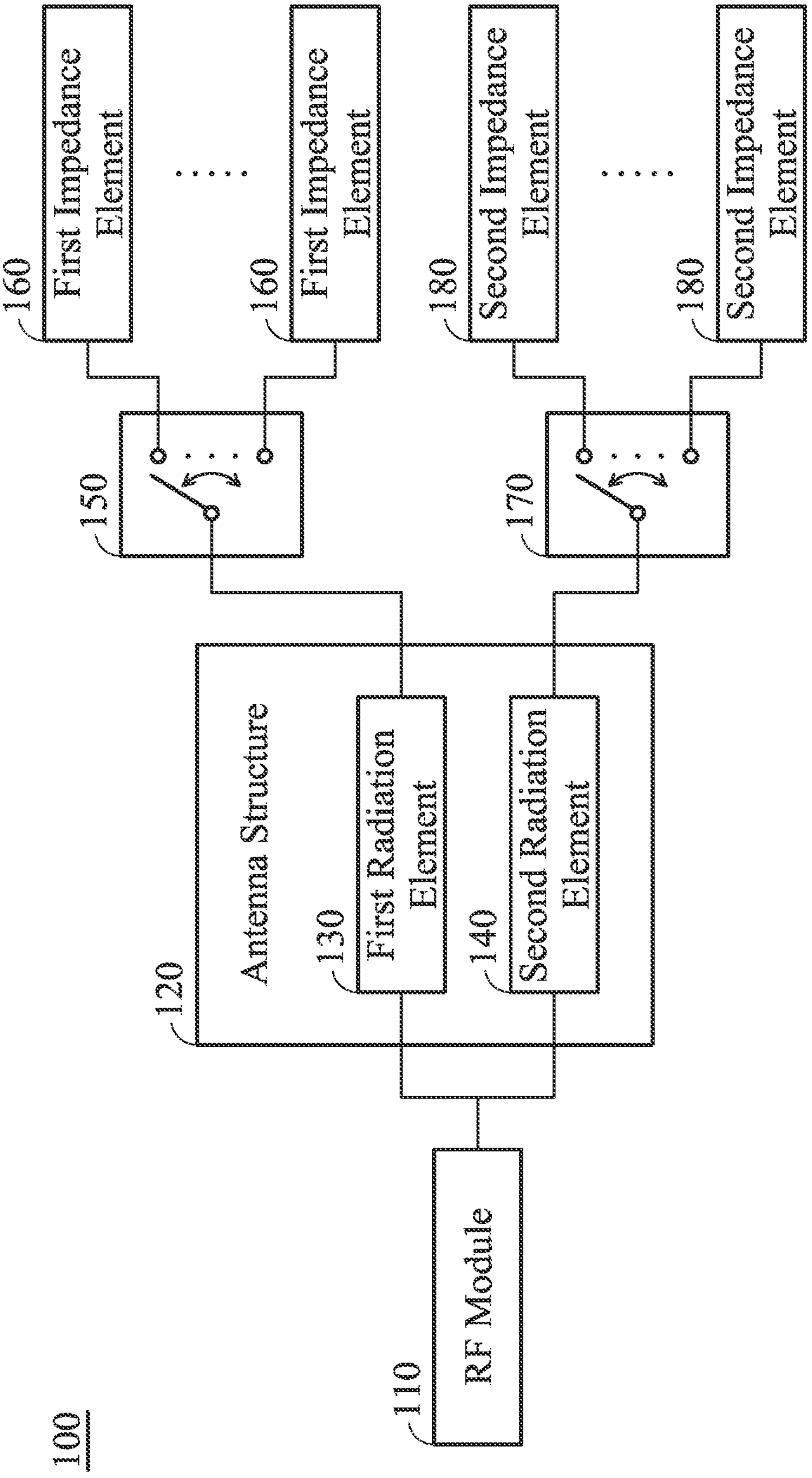
FIG. 1 is a diagram of a communication device according to an embodiment of the invention.

In order to illustrate the purposes, features and advantages of the invention, the embodiments and figures of the invention are shown in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range. One skilled in the art can solve the technical problem within a predetermined error range and achieve the proposed technical performance. Also, the term “couple” is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a communication device 100 according to an embodiment of the invention. The communication device 100 may be applied to a mobile device, such as a smart watch, a smartphone, a tablet computer, a notebook computer, a wireless access point, a router, or any device for communication. Alternatively, the communication device 100 may be applied to an electronic device, such as any unit operating within IOT (Internet of Things).

As shown in FIG. 1, the communication device 100 includes an RF (Radio Frequency) module 110, an antenna structure 120, a first switch element 150, a plurality of first impedance elements 160, a second switch element 170, and a plurality of second impedance elements 180. It should be understood that the communication device 100 may further include other components, such as a processor, a power supply module, and/or a housing, although they are not displayed in FIG. 1.

The antenna structure 120 includes a first radiation element 130 and a second radiation element 140. The first radiation element 130 and the second radiation element 140 may both be made of metal materials, such as copper, silver, aluminum, iron, or their alloys. The first radiation element 130 and the second radiation element 140 of the antenna structure 120 are respectively coupled to the RF module 110. It should be understood that the shape and type of the antenna structure 120 are not limited in the invention. In some embodiments, the antenna structure 120 is a loop antenna, a monopole antenna, a dipole antenna, a helical antenna, a patch antenna, or a PIFA (Planar Inverted F Antenna), but it is not limited thereto.

A terminal of the first switch element 150 is coupled to the first radiation element 130, and another terminal of the first switch element 150 is switchable between the first impedance elements 160. The first impedance elements 160 may have different impedance values. A terminal of the second switch element 170 is coupled to the second radiation element 140, and another terminal of the second switch element 170 is switchable between the second impedance elements 180. The second impedance elements 180 may have different impedance values. It should be understood that the total number of first impedance elements 160 and the total number of second impedance elements 180 are not limited in the invention. In some embodiments, the first switch element 150 selects one of the first impedance elements 160 according to a first control signal, and the second switch element 170 selects one of the second impedance elements 180 according to a second control signal. The first control signal and the second control signal may be generated by a processor (not shown) according to a user input.

With the design of the invention, the antenna structure 120 of the communication device 100 can cover a plurality of operational frequency bands by appropriately controlling the first switch element 150 and the second switch element 170. Accordingly, the communication device 100 can support the wideband operations of LTE (Long Term Evolution) and the next 5G (5th Generation Mobile Networks) communication, without additionally increasing the total device size. The following embodiments will introduce different configurations and detailed structural features of the communication device 100. It should be noted these figures and descriptions are merely exemplary, rather than limitations of the invention.

Figure 2A:
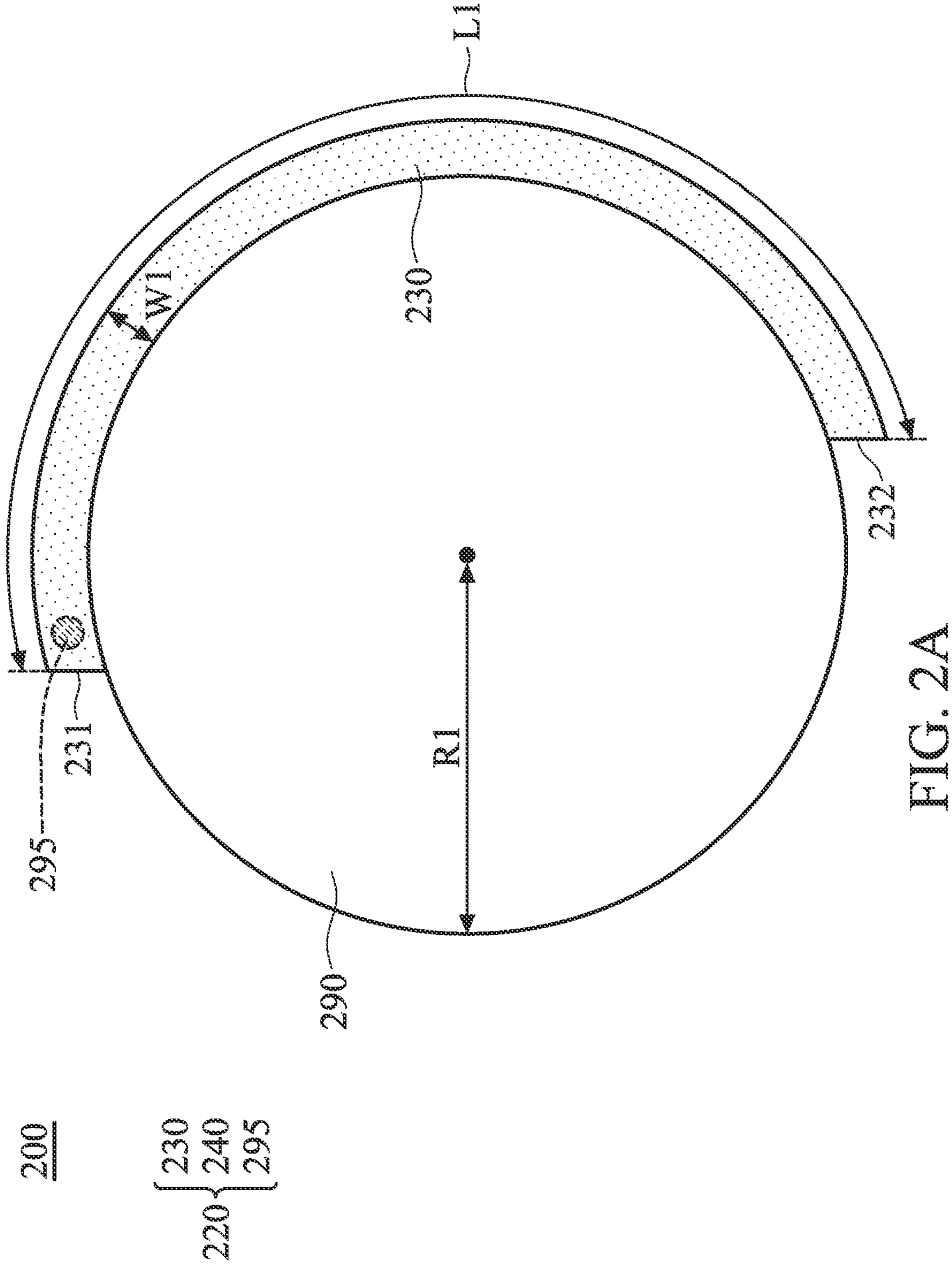
FIG. 2A is a top view of a communication device according to an embodiment of the invention.
Figure 2B:
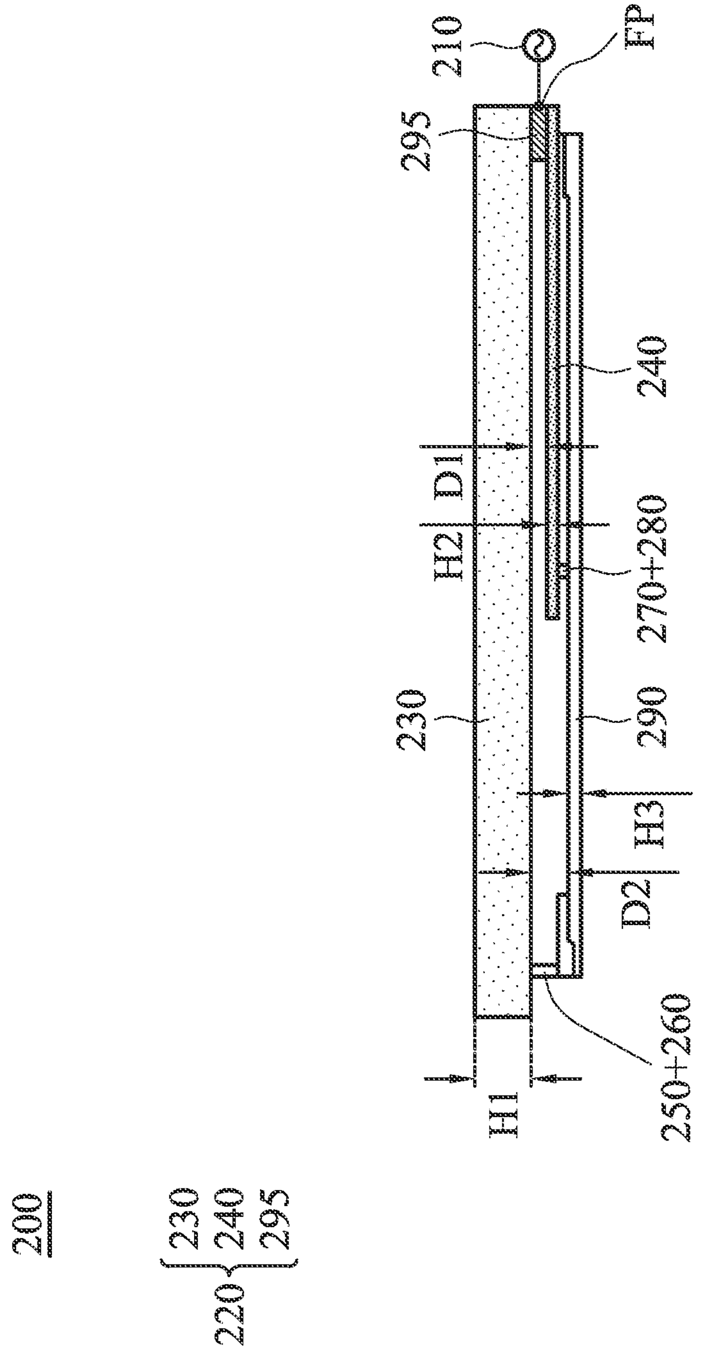
FIG. 2B is a side view of a communication device according to an embodiment of the invention.
Figure 2C:
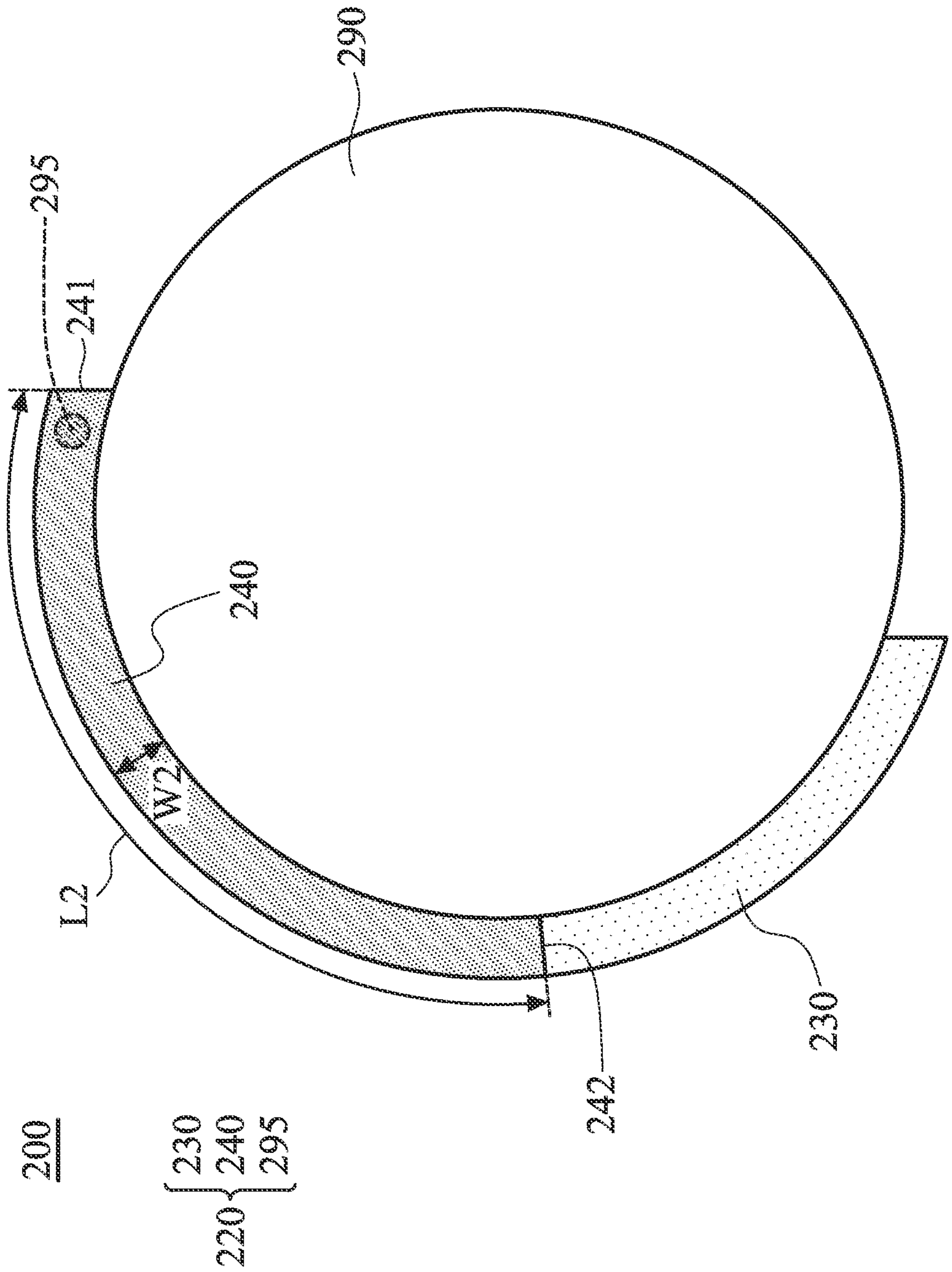
FIG. 2C is a back view of a communication device according to an embodiment of the invention.

FIG. 2A is a top view of a communication device 200 according to an embodiment of the invention. FIG. 2B is a side view of the communication device 200 according to an embodiment of the invention. FIG. 2C is a back view of the communication device 200 according to an embodiment of the invention. Please refer to FIG. 2A, FIG. 2B, and FIG. 2C together. In the embodiment of FIG. 2A, FIG. 2B, and FIG. 2C, the communication device 200 includes an RF module 210, an antenna structure 220, a first switch element 250, a plurality of first impedance elements 260, a second switch element 270, a plurality of second impedance elements 280, and a PCB (Printed Circuit Board) 290. The antenna structure 220 includes a first radiation element 230, a second radiation element 240, and a feeding connection element 295.

The PCB 290 may substantially have a circular shape. The PCB 290 provides a ground voltage VSS. The second radiation element 240 is disposed between the first radiation element 230 and the PCB 290. For example, the first radiation element 230, the second radiation element 240, and the PCB 290 may be substantially parallel to each other (i.e., they may be disposed on three parallel planes, respectively).

The first radiation element 230 may substantially have a long arc-shape, and it may extend along the outer edge of the PCB 290. Specifically, the first radiation element 230 has a first end 231 and a second end 232. The first end 231 of the first radiation element 230 is coupled to the feeding connection element 295. The second end 232 of the first radiation element 230 is coupled to the first switch element 250.

The second radiation element 240 may substantially have a short arc-shape, and it may extend along the outer edge of the PCB 290. Specifically, the second radiation element 240 has a first end 241 and a second end 242. The first end 241 of the second radiation element 240 is coupled to the feeding connection element 295. The second end 242 of the second radiation element 240 is coupled to the second switch element 270. In some embodiments, the second radiation element 240 has a vertical projection with respect to the PCB 290, and the vertical projection at least partially overlaps the first radiation element 230.

The feeding connection element 295 may substantially have a cylindrical shape, a square cylinder, or a triangular cylinder, but it is not limited thereto. The feeding connection element 295 is coupled between the first end 231 of the first radiation element 230 and the first end 241 of the second radiation element 240. In some embodiments, the antenna structure 220 has a feeding point FP coupled to the RF module 210, and the feeding point FP is adjacent to the feeding connection element 295. It should be noted that the term "adjacent" or "close" over the disclosure means that the distance (spacing) between two corresponding elements is shorter than a predetermined distance (e.g., 5 mm or shorter), or means that the two corresponding elements are touching each other directly (i.e., the aforementioned distance/spacing therebetween is reduced to 0). Accordingly, the first radiation element 230 and the second radiation element 240 of the antenna structure 220 can be excited together by the RF module 210 using the feeding connection element 295.

Figure 3A:
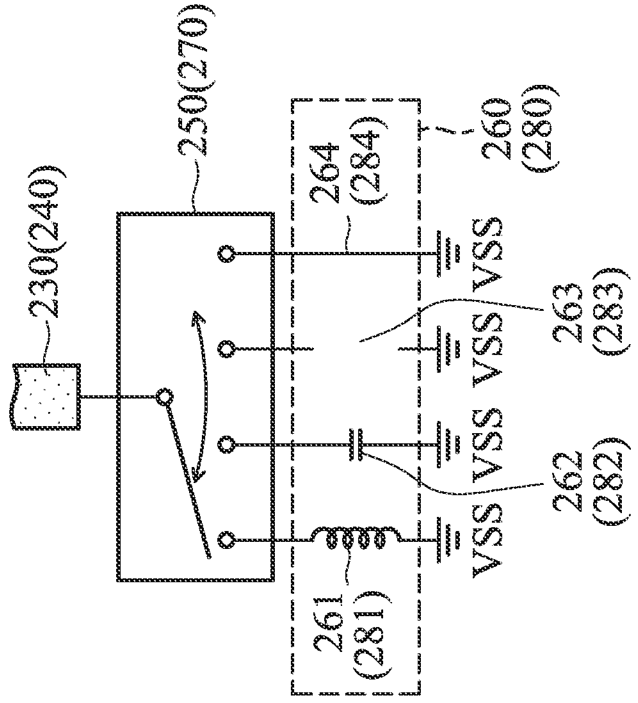
FIG. 3A is a diagram of a first switch element and first impedance elements (or a second switch element and second impedance elements) according to an embodiment of the invention.

FIG. 3A is a diagram of the first switch element 250 and the first impedance elements 260 according to an embodiment of the invention. In the embodiment of FIG. 3A, a terminal of the first switch element 250 is coupled to the first radiation element 230, and another terminal of the first switch element 250 is switchable between the first impedance elements 260. The first impedance elements 260 include an inductive element 261, a capacitive element 262, an open-circuited element 263, and/or a short-circuited element 264, which may all be coupled to the ground voltage VSS of the PCB 290.

Alternatively, FIG. 3A is a diagram of the second switch element 270 and the second impedance elements 280 according to an embodiment of the invention. In the embodiment of FIG. 3A, a terminal of the second switch element 270 is coupled to the second radiation element 240, and another terminal of the second switch element 270 is switchable between the second impedance elements 280. The second impedance elements 280 include an inductive element 281, a capacitive element 282, an open-circuited element 283, and/or a short-circuited element 284, which may all be coupled to the ground voltage VSS of the PCB 290.

Figure 3B:
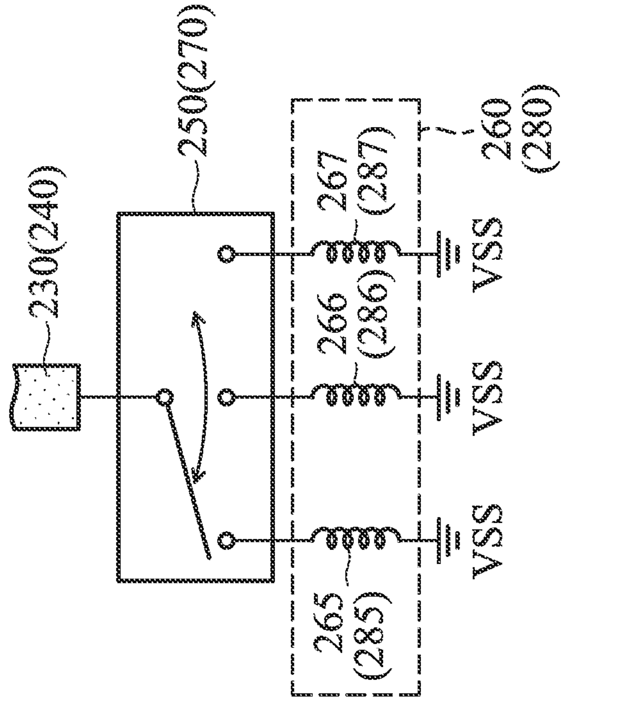
FIG. 3B is a diagram of a first switch element and first impedance elements (or a second switch element and second impedance elements) according to another embodiment of the invention.

FIG. 3B is a diagram of the first switch element 250 and the first impedance elements 260 according to another embodiment of the invention. In the embodiment of FIG. 3B, a terminal of the first switch element 250 is coupled to the first radiation element 230, and another terminal of the first switch element 250 is switchable between the first impedance elements 260. The first impedance elements 260 include a first inductive element 265, a second inductive element 266, and a third inductive element 267, which may all be coupled to the ground voltage VSS of the PCB 290.

Alternatively, FIG. 3B is a diagram of the second switch element 270 and the second impedance elements 280 according to another embodiment of the invention. In the embodiment of FIG. 3B, a terminal of the second switch element 270 is coupled to the second radiation element 240, and another terminal of the second switch element 270 is switchable between the second impedance elements 280. The second impedance elements 280 include a first inductive element 285, a second inductive element 286, and a third inductive element 287, which may all be coupled to the ground voltage VSS of the PCB 290.

Figure 4A:
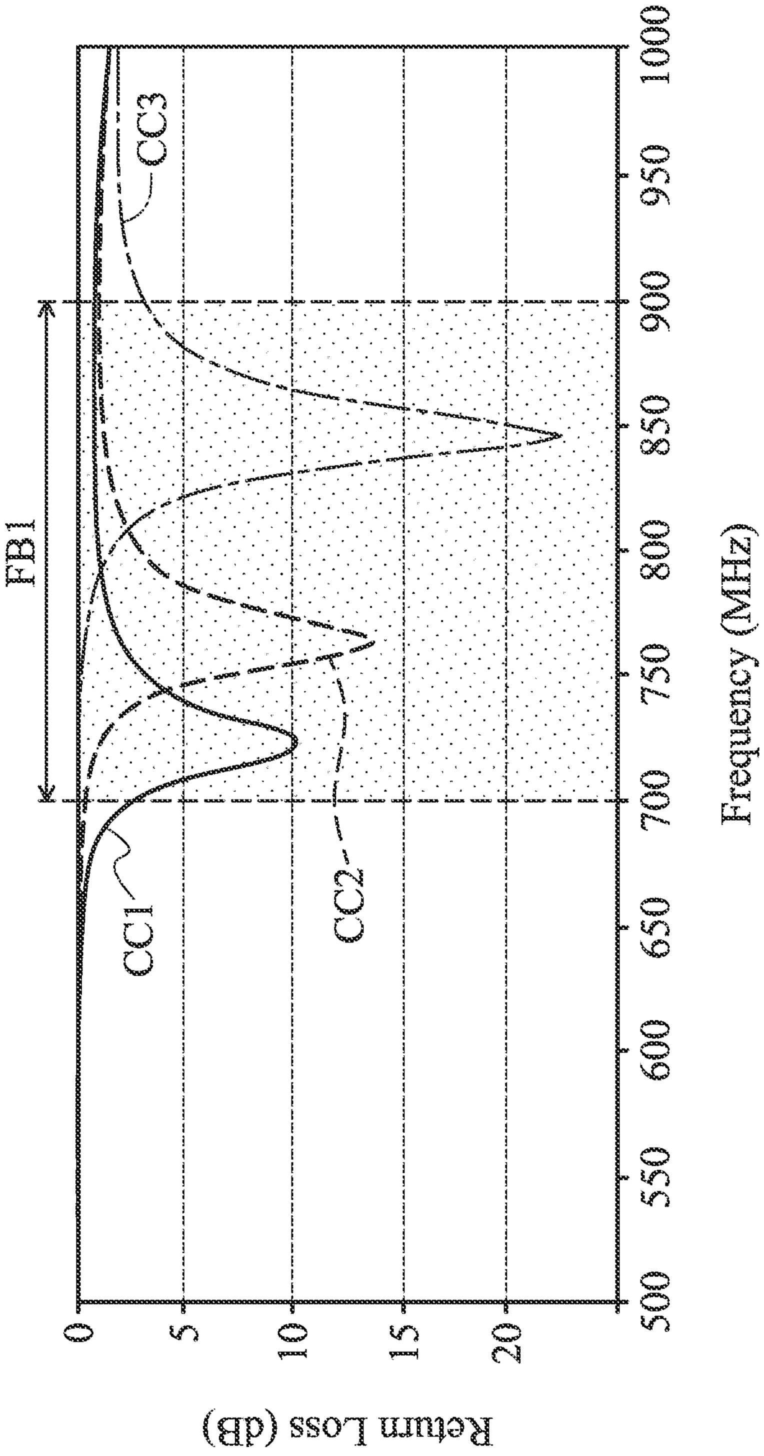
FIG. 4A is a diagram of return loss of an antenna structure of a communication device according to an embodiment of the invention.

FIG. 4A is a diagram of return loss of the antenna structure 220 of the communication device 200 according to an embodiment of the invention. The horizontal axis represents the operational frequency (MHz), and the vertical axis represents the return loss (dB). As shown in FIG. 4A, a first curve CC1 represents the operational characteristic of the antenna structure 220 when the first switch element 250 and the second switch element 270 select an impedance element with a large inductance. A second curve CC2 represents the operational characteristic of the antenna structure 220 when the first switch element 250 and the second switch element 270 select an impedance element with a median inductance. A third curve CC3 represents the operational characteristic of the antenna structure 220 when the first switch element 250 and the second switch element 270 select an impedance element with a small inductance. It should be understood that the invention is not limited thereto. In alternative embodiments, the first switch element 250 and the second switch element 270 can achieve similar levels of performance by selecting the capacitive element, the open-circuited element, and/or the short-circuited element.

Figure 4B:
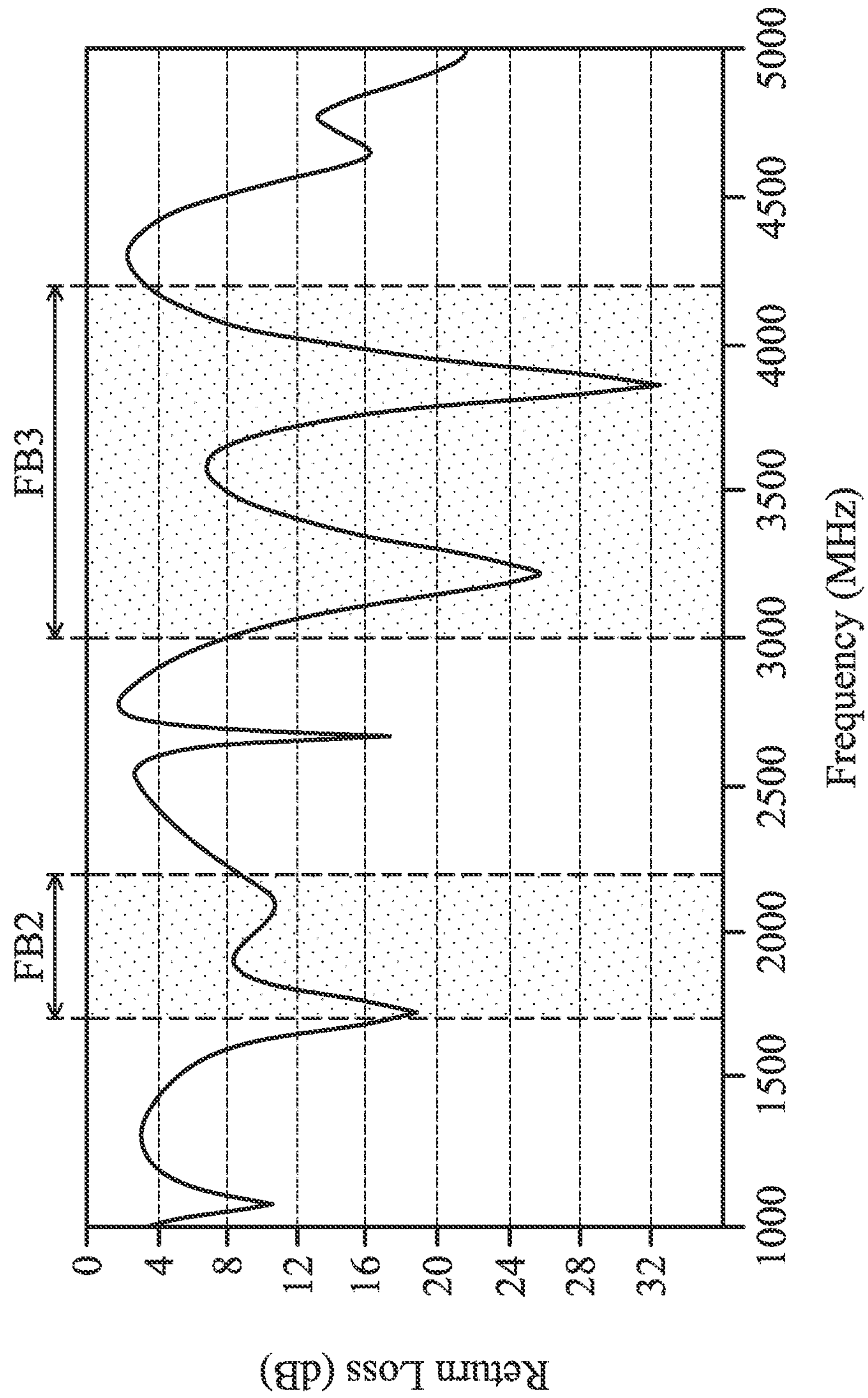
FIG. 4B is a diagram of return loss of an antenna structure of a communication device according to an embodiment of the invention.
Figure 4C:
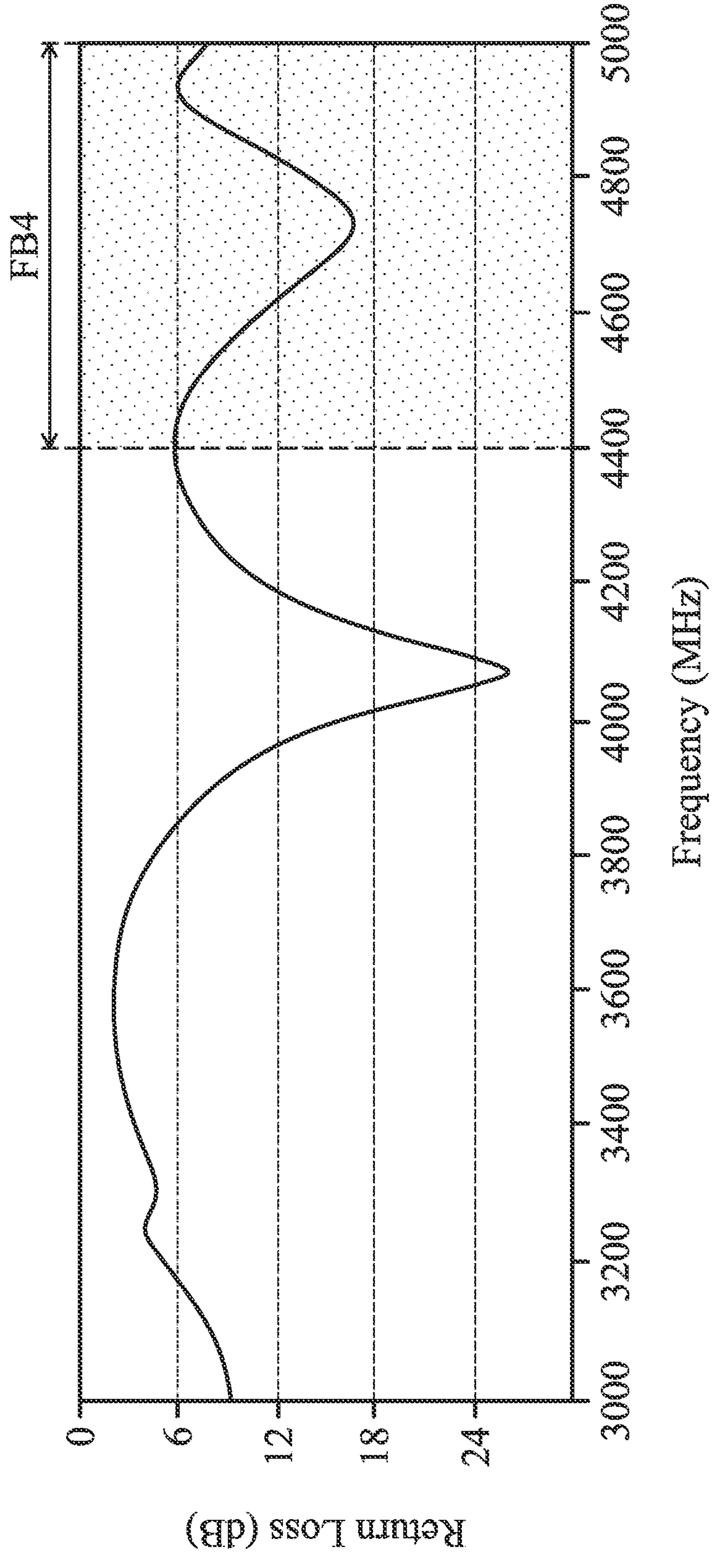
FIG. 4C is a diagram of return loss of an antenna structure of a communication device according to an embodiment of the invention.

Furthermore, FIG. 4B and FIG. 4C are diagrams of return loss of the antenna structure 220 of the communication device 200 according to an embodiment of the invention. The horizontal axis represents the operational frequency (MHz), and the vertical axis represents the return loss (dB). According to the measurement of FIG. 4A, FIG. 4B, and FIG. 4C, the antenna structure 220 of the communication device 200 can cover a first frequency band FB1, a second frequency band FB2, a third frequency band FB3, and a fourth frequency band FB4. For example, the first frequency band FB1 may be from 700 MHz to 900 MHz, the second frequency band FB2 may be from 1700 MHz to 2200 MHz, the third frequency band FB3 may be from 3000 MHz to 4200 MHz, and the fourth frequency band FB4 may be from 4400 MHz to 5000 MHz. Accordingly, the communication device 200 can support at least the wideband operations of the original LTE and the next 5G communication.

In some embodiments, the operational principles of the communication device 200 will be described as follows. The first radiation element 230 is excited to generate a fundamental resonant mode, thereby forming the first frequency band FB1 of the antenna structure 220. The second radiation element 240 is excited to generate another fundamental resonant mode, thereby forming the second frequency band FB2 of the antenna structure 220. The first radiation element 230 and the second radiation element 240 are further excited together to generate a higher-order resonant mode, thereby forming the third frequency band FB3 of the antenna structure 220. The second radiation element 240 is further excited independently to generate another higher-order resonant mode, thereby forming the fourth frequency band FB4 of the antenna structure 220. According to practical measurement, if the thickness H1 of the first radiation element 230 is designed to be greater than the thickness H2 of the second radiation element 240, it can help to enhance the radiation efficiency of the first frequency band FB1. In addition, the distance D1 between the first radiation element 230 and the second radiation element 240 can be designed within an appropriate range, so as to avoid too high a coupling amount (if the distance D1 is very short) and avoid too large a device size (if the distance D1 is very long). It should be noted that the total size of the communication device 200 and the antenna structure 220 therein can be significantly reduced since the first radiation element 230, the second radiation element 240, and the PCB 290 are well integrated with each other.

In some embodiments, the element sizes of the communication device 200 will be described as follows. The length L1 of the first radiation element 230 may be substantially equal to 0.5 wavelength (λ/2) of the first frequency band FB1 of the antenna structure 220. The width W1 of the first radiation element 230 may be from 1 mm to 3 mm. The thickness H1 of the first radiation element 230 may be from 2 mm to 4 mm. The length L2 of the second radiation element 240 may be substantially equal to 0.5 wavelength (λ/2) of the second frequency band FB2 of the antenna structure 220. The width W2 of the second radiation element 240 may be from 1 mm to 3 mm. The thickness H2 of the second radiation element 240 may be from 0.5 mm to 1.5 mm. The radius R1 of the PCB 290 may be from 20 mm to 25 mm. The thickness H3 of the PCB 290 may be from 0.5 mm to 1.5 mm. The distance D1 between the first radiation element 230 and the second radiation element 240 may be from 3 mm to 5 mm. The distance D2 between the first radiation element 230 and the PCB 290 may be from 8 mm to 12 mm. The above ranges of element sizes are calculated and obtained according to many experimental results, and they can help to optimize the operational bandwidth and impedance matching of the antenna structure 220 of the communication device 200.

Figure 5A:
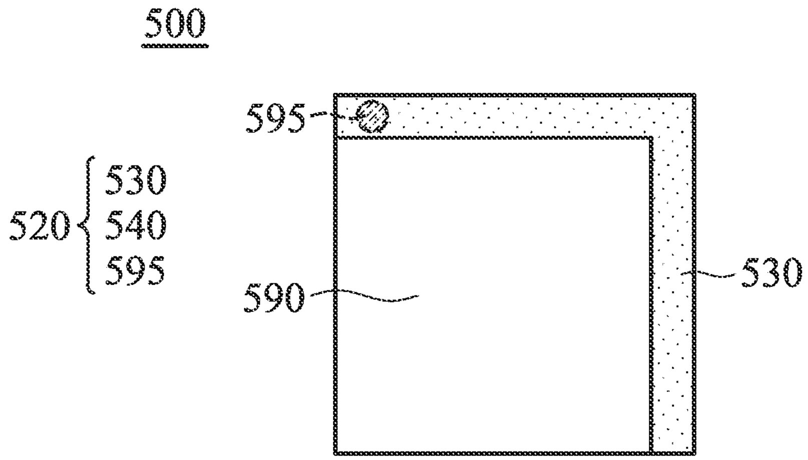
FIG. 5A is a top view of a communication device according to another embodiment of the invention.
Figure 5B:
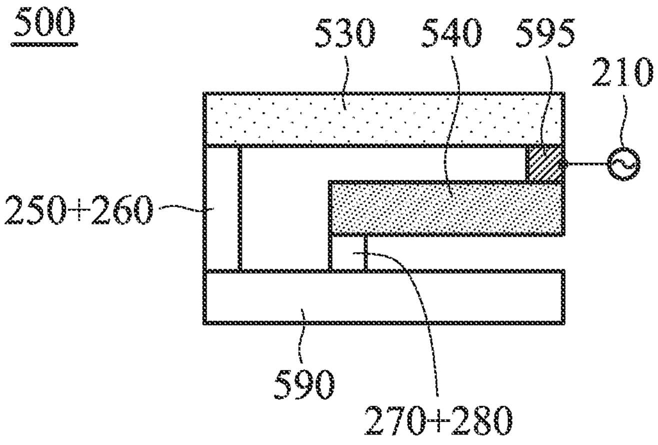
FIG. 5B is a side view of a communication device according to another embodiment of the invention.
Figure 5C:
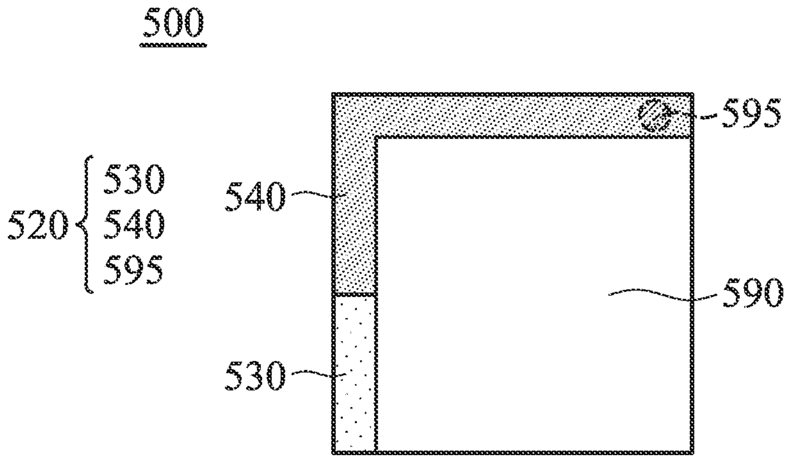
FIG. 5C is a back view of a communication device according to another embodiment of the invention.

FIG. 5A is a top view of a communication device 500 according to another embodiment of the invention. FIG. 5B is a side view of the communication device 500 according to another embodiment of the invention. FIG. 5C is a back view of the communication device 500 according to another embodiment of the invention. FIG. 5A, FIG. 5B, and FIG. 5C are similar to FIG. 2A, FIG. 2B, and FIG. 2C. In the embodiment of FIG. 5A, FIG. 5B, and FIG. 5C, a PCB 590 of the communication device 500 substantially has a rectangular shape or a square shape, and an antenna structure 520 of the communication device 500 includes a first radiation element 530, a second radiation element 540, and a feeding connection element 595. The first radiation element 530 may substantially have a long L-shape, and it may extend along two perpendicular edges of the PCB 590. The second radiation element 540 may substantially have a short L-shape, and it may extend along the aforementioned two perpendicular edges of the PCB 590. The feeding connection element 595 is coupled between the first radiation element 530 and the second radiation element 540. The feeding connection element 595 is further coupled to the RF module 210. In some embodiments, the second radiation element 540 has a vertical projection with respect to the PCB 590, and the vertical projection at least partially overlaps the first radiation element 530. Other features of the communication device 500 of FIG. 5A, FIG. 5B, and FIG. 5C are similar to those of the communication device 200 of FIG. 2A, FIG. 2B, and FIG. 2C. Accordingly, the two embodiments can achieve similar levels of performance.

The invention proposes a novel communication device and a novel antenna structure. In comparison to the conventional design, the invention has at least the advantages of small size, wide bandwidth, and low manufacturing cost, and therefore it is suitable for application in a variety of wearable devices, mobile devices, or IOT.

Note that the above element sizes, element shapes, and frequency ranges are not limitations of the invention. An antenna designer can fine-tune these settings or values according to different requirements. It should be understood that the communication device of the invention is not limited to the configurations of FIGS. 1-5. The invention may merely include any one or more features of any one or more embodiments of FIGS. 1-5. In other words, not all of the features displayed in the figures should be implemented in the communication device of the invention.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication device, comprising:

an RF (Radio Frequency) module;

an antenna structure, coupled to the RF module, wherein the antenna structure comprises a first radiation element and a second radiation element;

a first switch element, coupled to the first radiation element;

a plurality of first impedance elements, wherein the first switch element is switchable between the first impedance elements;

a second switch element, coupled to the second radiation element; and a plurality of second impedance elements, wherein the second switch element is switchable between the second impedance elements;

wherein the antenna structure further comprises a feeding connection element, and the feeding connection element is coupled between the first radiation element and the second radiation element;

wherein a thickness of the first radiation element is greater than a thickness of the second radiation element;

wherein the thickness of the first radiation element is from 2 mm to 4 mm, and the thickness of the second radiation element is from 0.5 mm to 1.5 mm;

wherein the first radiation element and the second radiation element are respectively disposed on two different planes which are substantially parallel to each other;

wherein a vertical projection of the second radiation element at least partially overlaps the first radiation element.

2. The communication device as claimed in claim 1, wherein the antenna structure covers a first frequency band, a second frequency band, a third frequency band, and a fourth frequency band.

3. The communication device as claimed in claim 2, wherein the first frequency band is from 700 MHz to 900 MHz, the second frequency band is from 1700 MHz to 2200 MHz, the third frequency band is from 3000 MHz to 4200 MHz, and the fourth frequency band is from 4400 MHz to 5000 MHz.

4. The communication device as claimed in claim 2, wherein a length of the first radiation element is substantially equal to 0.5 wavelength of the first frequency band.

5. The communication device as claimed in claim 2, wherein a length of the second radiation element is substantially equal to 0.5 wavelength of the second frequency band.

6. The communication device as claimed in claim 1, wherein the antenna structure has a feeding point coupled to the RF module, and the feeding point is adjacent to the feeding connection element.

7. The communication device as claimed in claim 1, wherein the first radiation element has a first end and a second end, the first end of the first radiation element is coupled to the feeding connection element, and the second end of the first radiation element is coupled to the first switch element.

8. The communication device as claimed in claim 1, wherein the second radiation element has a first end and a second end, the first end of the second radiation element is coupled to the feeding connection element, and the second end of the second radiation element is coupled to the second switch element.

9. The communication device as claimed in claim 1, further comprising:

a PCB (Printed Circuit Board), providing a ground voltage, wherein the second radiation element is disposed between the first radiation element and the PCB.

10. The communication device as claimed in claim 9, wherein the first radiation element, the second radiation element, and the PCB are substantially parallel to each other.

11. The communication device as claimed in claim 9, wherein the PCB substantially has a circular shape.

12. The communication device as claimed in claim 11, wherein the first radiation element substantially has a long arc-shape and extends along an outer edge of the PCB.

13. The communication device as claimed in claim 11, wherein the second radiation element substantially has a short arc-shape and extends along an outer edge of the PCB.

14. The communication device as claimed in claim 9, wherein the first impedance elements comprise an inductive element, a capacitive element, an open-circuited element, and/or a short-circuited element coupled to the ground voltage.

15. The communication device as claimed in claim 9, wherein the second impedance elements comprise an inductive element, a capacitive element, an open-circuited element, and/or a short-circuited element coupled to the ground voltage.

16. The communication device as claimed in claim 1, wherein a width of the first radiation element is from 1 mm to 3 mm.

17. The communication device as claimed in claim 1, wherein a width of the second radiation element is from 1 mm to 3 mm.

* * * * *